United States Patent
Abdul Kadar

(10) Patent No.: US 11,436,665 B1
(45) Date of Patent: Sep. 6, 2022

(54) QUICK BASKET-BUILDING HOVER WIDGET

(71) Applicant: Amazon Technologies, Inc., Seattle, WA (US)

(72) Inventor: Feroz Abdul Kadar, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 16/364,723

(22) Filed: Mar. 26, 2019

(51) Int. Cl.
*G06Q 30/00* (2012.01)
*G06Q 30/06* (2012.01)
*G06F 16/9535* (2019.01)
*G06N 20/00* (2019.01)

(52) U.S. Cl.
CPC ..... *G06Q 30/0643* (2013.01); *G06F 16/9535* (2019.01); *G06N 20/00* (2019.01); *G06Q 30/0631* (2013.01)

(58) Field of Classification Search
None
See application file for complete search history.

(56) References Cited

U.S. PATENT DOCUMENTS

| | | | |
|---|---|---|---|
| 9,361,640 B1* | 6/2016 | Donsbach | G06Q 30/0633 |
| 2013/0110671 A1* | 5/2013 | Gray | G06Q 30/06 705/26.8 |
| 2016/0092042 A1* | 3/2016 | Yenigalla | H04N 21/4438 715/716 |
| 2016/0210602 A1* | 7/2016 | Siddique | G06Q 20/407 |

* cited by examiner

*Primary Examiner* — Marissa Thein
*Assistant Examiner* — Maria S. P. Heath
(74) *Attorney, Agent, or Firm* — Patterson + Sheridan, LLP

(57) ABSTRACT

Techniques are described for enhancing a user's experience with a retail software application. In one technique, a first trigger event within a first widget of a first page of an application is detected. The first widget indicates a set of items associated with a user interacting with the application. A non-modal window is presented on the first page of the application in response to the detection of the first trigger event. The non-modal window includes information associated with items indicated by the first widget. A second trigger event associated with one of the items within the non-modal window is detected on the first page of the application. A selection state of the item is determined and stored in response to the second trigger event. The non-modal window is collapsed in response to detection of a third trigger event outside of the non-modal window.

20 Claims, 16 Drawing Sheets

QUICK BASKET-BUILDING HOVER WIDGET

BACKGROUND

Retailers, wholesalers, and other product distributors typically allow customers to order, purchase, lease, borrow, rent, etc., various items (e.g., from inventory) via software applications and services made available to the customers over computer networks, such as the Internet. For example, software applications used to browse items from a retailer's inventory and place orders for item(s) from the retailer's inventory are frequently offered as an online service. In some cases, retailers may offer customers access to both online services and local client applications, regardless of whether the application is installed locally by a customer or accessed as an online service (e.g., via an e-commerce/retail website). Once customer data is stored by a retailer, customers can access their data using a variety of clients, including a web browser used to access a software application as a series of web pages, dedicated "thin" client applications, and so-called "apps" accessed using a mobile telephone or computing tablet.

BRIEF DESCRIPTION OF DRAWINGS

Various embodiments in accordance with the present disclosure will be described with reference to the drawings, where like designations denote like elements.

DETAILED DESCRIPTION

Software applications are generally designed to be as user-friendly as possible, e.g., in an attempt to retain users. A retail software application, for example, can organize application content into areas or regions associated with particular categories/sub-categories (or groupings). The categories may correspond to different groupings of items available in a given retailer's inventory, aisle, etc. For example, assuming the retail software application is associated with a "grocery" retailer (or store), the retail software application may provide application content corresponding to different categories, including, but not limited to, "produce," "perishables," "household items," "prepared foods," "deli," and so on.

In some cases, the retail software application can increase user retention by providing the user with a customized list of items (specific to the user) to reduce the likelihood of the user having to search for the items in the customized list and/or increase the likelihood that the user selects the items (e.g., for purchase). The customized list of items may be determined, based at least in part, on the user's previous purchase history, the user's previous interaction(s) with the retail software application (e.g., categories/sub-categories visited, amount of time spent on particular pages, etc.), other users' interactions with the retail software application (e.g., "trending" items), items available in the user's geographical area (e.g., locally sourced or provided items), and the like.

Figure 1A:
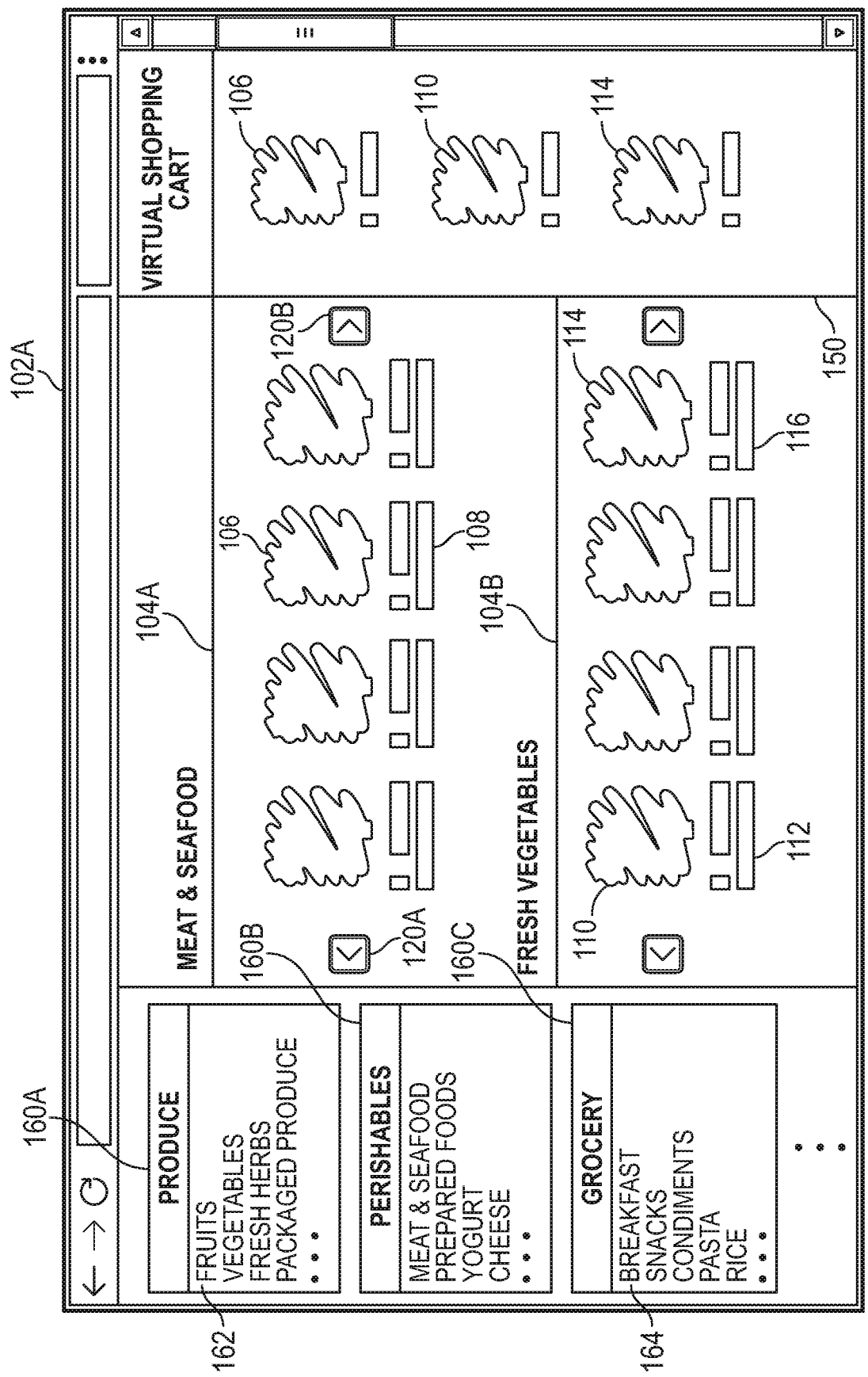
FIGS. 1A-1C depict example pages of a retail software application.

While retail software applications attempt to provide some degree of user personalization regarding the particular items that are shown to a user, these applications do not allow users to build a basket of items (also known as a "virtual shopping cart") and/or explore a retailer's inventory while maintaining the context of the parent page (also referred to as storefront page, welcome page, etc.). That is, with conventional software applications, a user generally has to navigate (e.g., back and forth) through multiple pages in order to build the user's basket and/or explore the retailer's inventory. FIG. 1A shows an example parent page 102A of a conventional retail software application. Here, the parent page 102 includes horizontal container widgets 104A and 104B that each hold (or list) a related set of individual items. In particular, the horizontal container widget 104A includes a set of items associated with "Meat & Seafood" and the horizontal container widget 104B includes a set of items associated with "Fresh Vegetables." The horizontal container widgets 104A and 104B provide, for each item within the horizontal container widget, information regarding the item (e.g., price, rating, brand name, etc.), a link to the particular item, and a button prompt that allows the user to add the item to the user's virtual shopping cart. Here, for example, a user interacting with the parent page 102A uses the button 108 to add item 106 within the horizontal container widget 104A to the user's virtual shopping cart 150, uses button 112 to add item 110 within the horizontal container widget 104B to the user's virtual shopping cart 150, and uses button 116 to add item 114 within the horizontal container widget 104B to the user's virtual shopping cart 150. Each horizontal container widget 104A and 104B also provides a set of scrolling (or slider) elements 120A and 120B that allow the user to navigate to additional items within the respective horizontal container widget.

In this example, the parent page 102A provides a user with a limited set of categories/sub-categories (e.g., "Meat & Seafood" and "Fresh Vegetables"), in which the user can browse through to select items without leaving the current page 102A. As a result, a user interacting with the parent page 102A has to navigate to other pages (e.g., page 102B in FIG. 1B, page 102C in FIG. 1C, etc.) provided by the retail software application in order to browse through and/or select items in other sub-categories (e.g., "Fruits," "Meal Kits," "Breakfast"). For example, the parent page 102A also includes one or more category indexes 160A, 160B, and 160C providing links to other pages of the application. The user may use the links provided by the category indexes 160A, 160B, and 160C to navigate to the other pages in order to add retail items of other categories (not provided on the parent page 102A) to the user's virtual shopping cart 150.

Figure 1B:
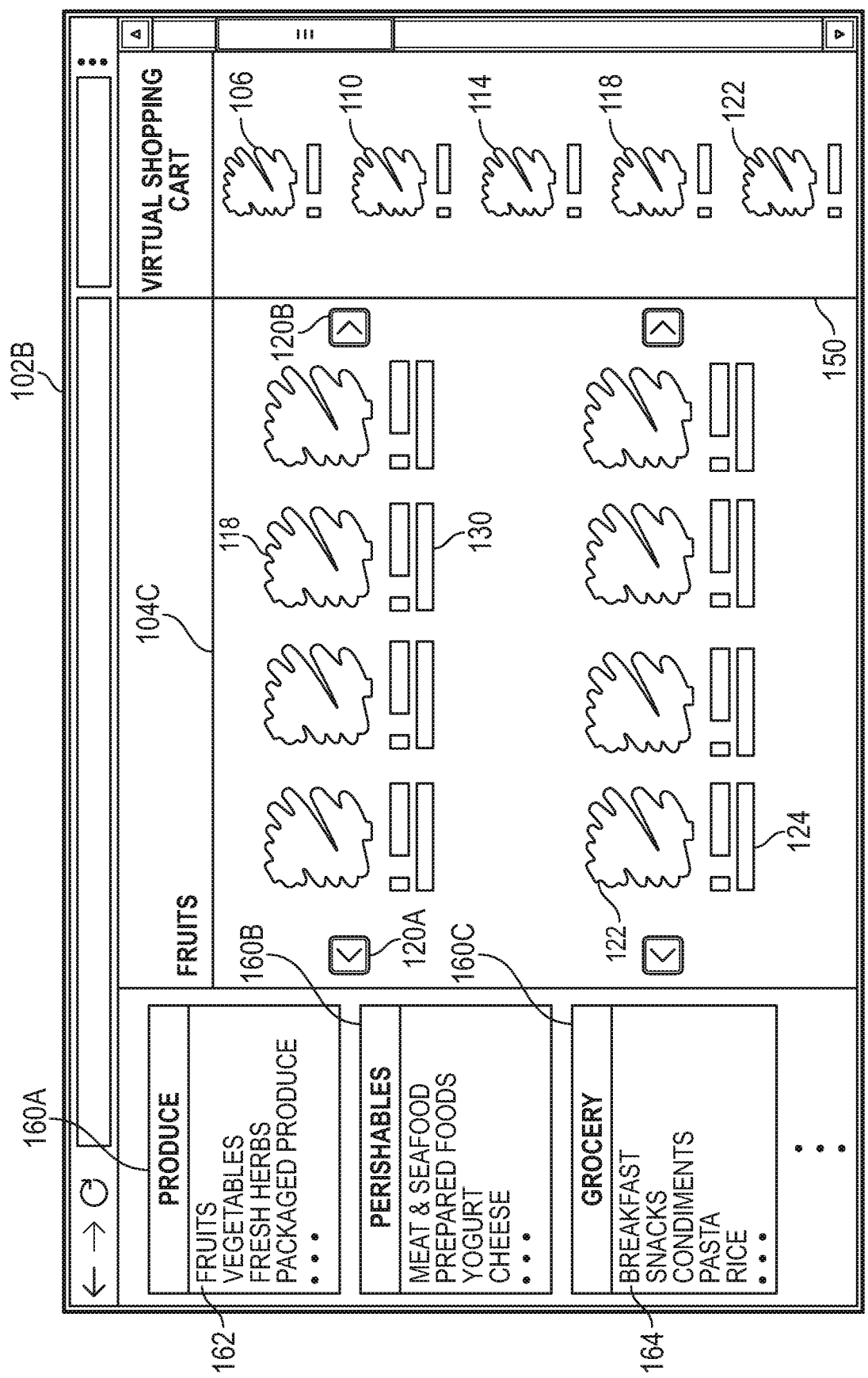
Figure 1C:
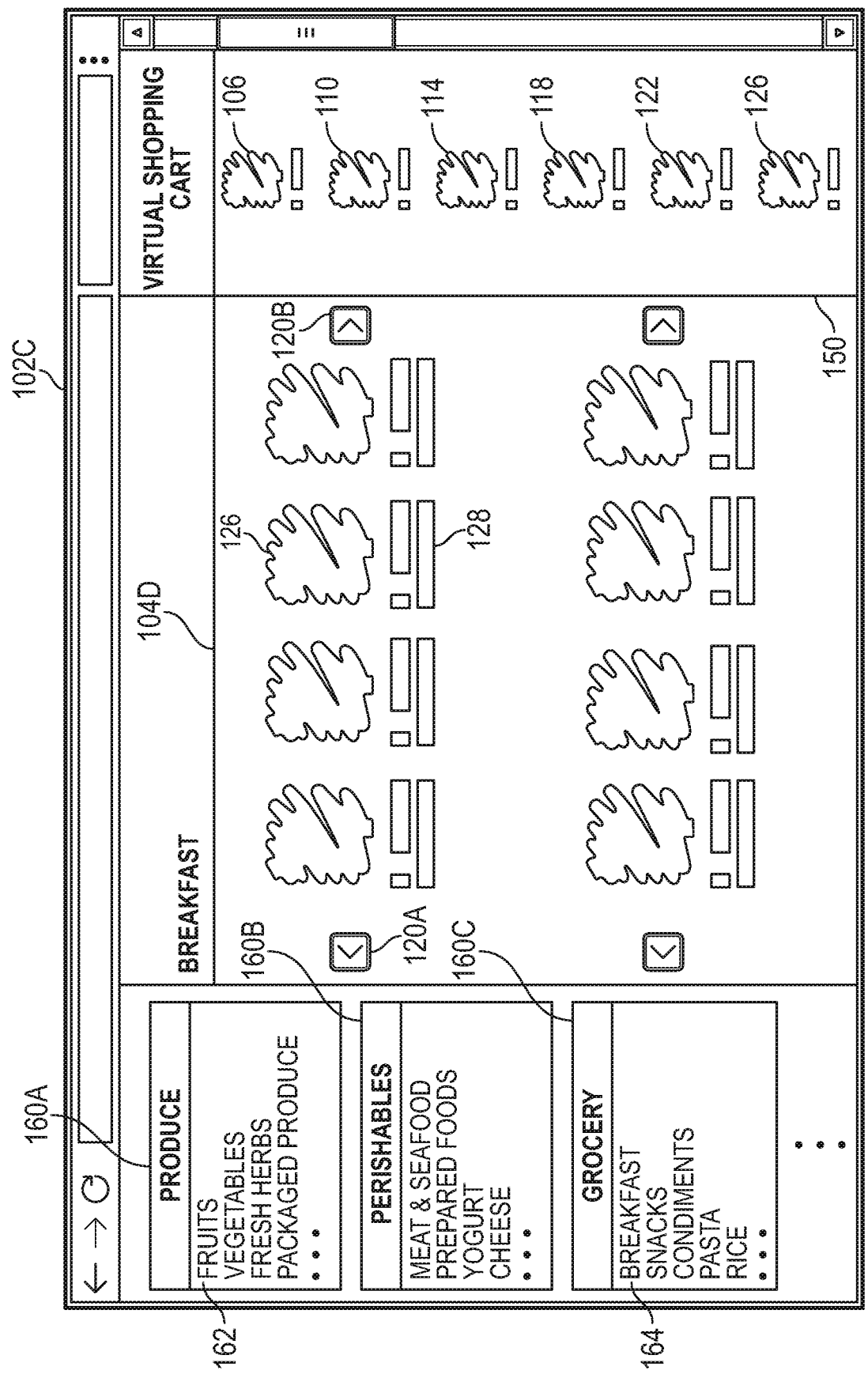

In one example, the user may navigate to page 102B in FIG. 1B for "Fruits" by selecting link 162 within the category index 160A. FIG. 1B shows an example (sub-category) page 102B for "Fruits" (provided by the retail software application) that may be visited by the user at a later point in the user's interaction with the retail software application. On page 102B, the user uses button 130 to add item 118 within the horizontal container widget 104C to the user's virtual shopping cart 150 and uses button 124 to add item 122 within the horizontal container widget 104C to the user's virtual shopping cart 150. In another example, the user may navigate to page 102C in FIG. 1C for "Breakfast" by selecting link 162 within the category index 160C. FIG. 1C shows an example (sub-category) page 102C for "Breakfast" (provided by the retail software application) that may be visited by the user at a later point in the user's interaction with the retail software application. On page 102C, the user uses button 128 to add item 126 within the horizontal container widget 104D to the user's virtual shopping cart 150.

The user may continue to navigate to different category/sub-category pages in the manner described with respect to FIGS. 1A-1C in order to build a basket (or virtual shopping cart) of particular items. Such an application design can result in the user spending a substantial amount of time and effort in order to build a basket. Further, in some cases, users who are unfamiliar with an application interface or functionality may abandon using the application. In this way, a retailer can lose current or potential customers.

Embodiments described herein provide techniques that enable users to quickly build a basket of items and/or explore (or browse) through a selection of items without losing context of the parent page of the retail software application. In one embodiment, the retail software application determines, for each user, a particular set of item groups (e.g., categories/sub-categories) where each item group includes a ranked list of items that the user has a high likelihood (e.g., greater than a threshold) of purchasing (e.g., based in part on past user behavior) while interacting with the application. As used herein, the particular set of item groups (or item categories/sub-categories) for a user may be referred to as a user-specific taxonomy and each item group within the set of item groups may be referred to as a taxon. In one embodiment, the retail software application renders a set of category widgets on at least a first page (e.g., parent page) of the retail software application. Each category widget presents items of a particular taxon (e.g., item group) within the user-specific taxonomy.

In some embodiments, the different taxons (e.g., within the user-specific taxonomy) that are presented by the category widgets may correspond to "aisles" within a physical retail store. As a reference example, a first category widget may present "breakfast items" (that may correspond to a first "aisle" in a physical retail store) and present "frozen foods" (that may correspond to a second "aisle" in a physical retail store). In addition, the set of items within each category widget can vary by brand, store, location, etc., based on the user's particular shopping history, item availability, etc.

As a user interacts with a retail software application, the user may hover (e.g., with a mouse pointer, finger, or other navigation tool) over the different category widgets located on a given page. As the user hovers over (or clicks) a given category widget, embodiments herein may present the user with a basket-building widget that enables the user to interact with the contents of that category widget. In one embodiment, the basket-building widget may provide an enlarged (or expanded) view (e.g., in a non-modal window) of the items within the category widget, and may provide various prompts to enable the user to interact with the different items. For example, the basket-building widget may provide links to enable the user to select, browse, and explore particular items within the category widget, without losing context on the current page. As opposed to using multiple clicks to add multiple items to the user's virtual shopping cart (e.g., as depicted in FIGS. 1A-1C), the basket-building widget may provide a prompt (within the non-modal window) that allows the user to add selected items to the user's virtual shopping cart, e.g., in a single click. In this manner, embodiments allow users to quickly build a basket of items and navigate through a retailer's inventory, reducing the likelihood of the user navigating back and forth on different category pages, which can be a major source of distraction. As used herein, a non-modal window may refer to an active window that does not prevent a user from interacting with other portions (e.g., other windows) of the application while the window is active.

Note that certain embodiments are described herein using a retail software application for a "grocery" retailer as an example of computer software that can provide basket-building widgets to improve the user's experience when interacting with the "grocery" retailer. In other embodiments, the techniques presented herein may be adapted for use by a broad variety of retailers (e.g., discount stores, department stores, video streaming services, etc.).

Figure 2:
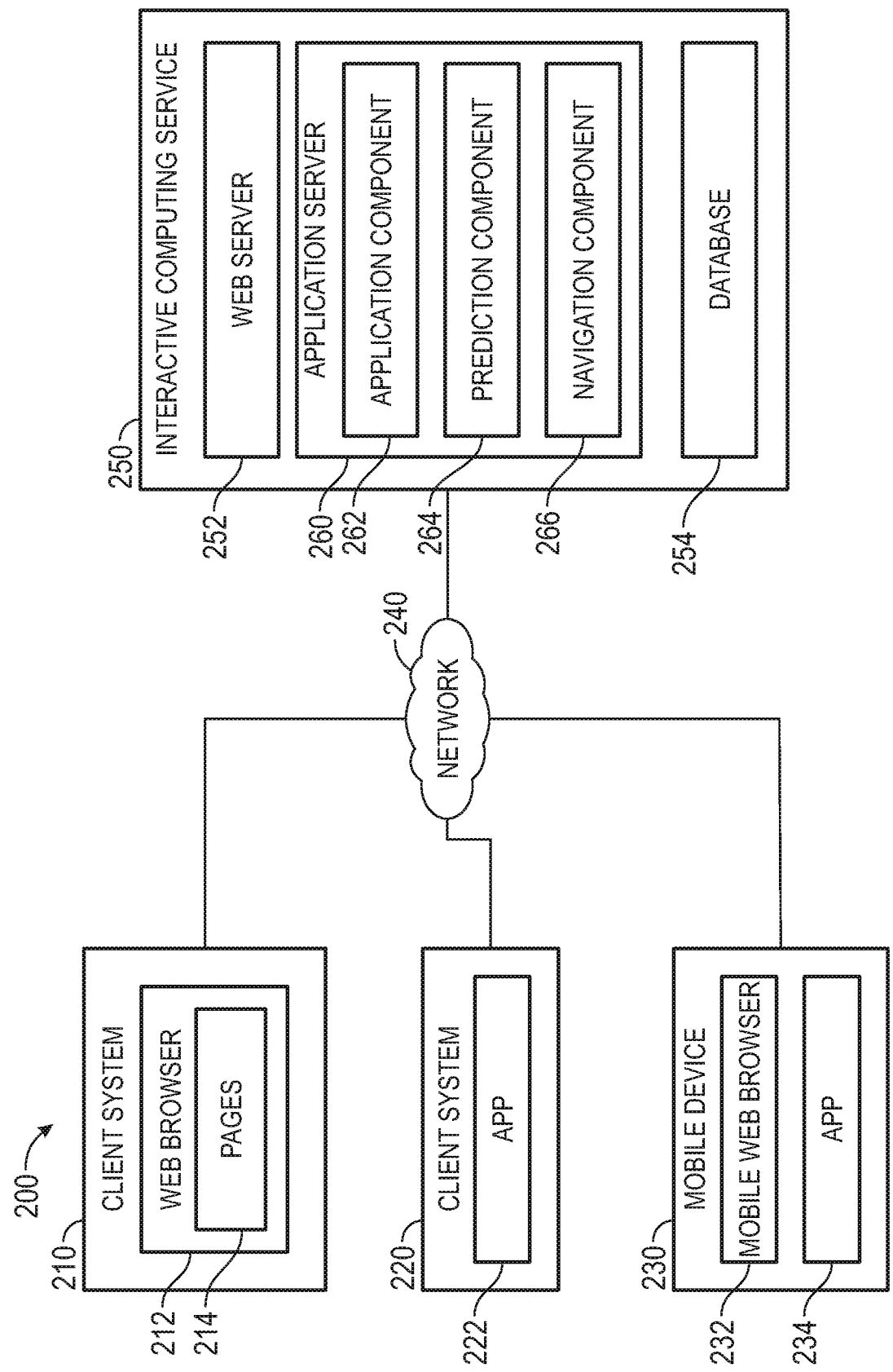
FIG. 2 illustrates an example of a computing environment used to provide an interactive computing service, according to one embodiment.

FIG. 2 is a block diagram illustrating an example computing environment 200 used to provide an interactive computing service 250, according to one embodiment. As shown, the computing environment 200 includes client systems 210, 220, a mobile device 230, and an interactive computing service 250, which are interconnected via a network 240. The network 240, in general, may be a wide area network (WAN), a local area network (LAN), a wireless LAN, a personal area network (PAN), a cellular network, etc. In a particular embodiment, the network 240 is the Internet.

Client systems 210 and 220 are representative of a variety of computing devices (systems), including a desktop computer, laptop computer, mobile computer (e.g., a tablet or a smartphone), digital media player, video game console, smart television, etc. The client systems 210 and 220 generally are configured to host applications used to access the interactive computing service 250. For example, client system 210 includes a web browser 212 used to access the interactive computing service 250 by rendering web pages 214 received from the interactive computing service 250. Similarly, client system 220 includes a client application 222. The client application 222 is representative of a component of a client server application (or other distributed application) which can communicate with the interactive computing service 250 over the network 240. Client application 222 may be a "thin" client where the processing is largely directed by the client application 222, but performed by computing systems of the interactive computing service 250 or a conventional software application installed on the client system 220. Mobile device 230 is representative of a variety of computing devices, such as a mobile telephone or computing tablet. The mobile device 230 may access the interactive computing service 250 over the network 240 using a mobile web browser 232 or local application or "app" 234 executed on the mobile device 230.

The web browsers 212 and 232, client application 222, and application 234 may communicate with the interactive computing service 250. For example, in the case where the interactive computing service 250 provides a retail software application, the web browsers 212 and 232, client application 222, and application 234 may provide software which allows a user to browse through a given retailer's inventory and select item(s) for purchase. The software application may also provide other features, such as the ability to post questions and answers about various items using an online community, provide feedback about various items to the software application, etc.

As shown, the interactive computing service 250 includes a web server 252, an application server 260, and a service content database 254. In this example, the interactive computing service 250 is generally modeled as a service backend (e.g., web server 252, application server 260, and a database). Of course, other software architectures or distributed application frameworks could be used. Web server 252 and application server 260 are representative of physical computing systems, as well as representative of virtual machine instances deployed to a computing cloud. Similarly, the database 254 can be located on a single computing system or distributed across multiple computing systems. The web server 252 may communicate with the application server 260 to respond to requests from applications on the client systems 210, 220, and the mobile device 230.

The application server 260 includes an application component 262, a prediction component 264, and a navigation component 266. The application component 262 may provide one or more software applications (e.g., retail software applications) that allow a user to browser through a retailer's inventory and/or select items for purchase. In one embodiment, the application component 262 may respond to requests from clients by generating hypertext markup language (HTML) and related content passed to clients (via the web server 252) and rendered as a user interface (e.g., pages, including forms, windows (e.g., non-modal windows), text fields, and so on, along with scripts or applets or widgets executed by a web browser). In some cases, the application component 262 may interact with other components of the application server 260 (e.g., prediction component 264) to pass HTML content and/or related data to clients. In some cases, the application 222 running on the client system 220 and/or the application 234 running on the mobile device 230 could generate information (or application) content to present data retrieved from the application server 260. In general, the application component 262 may be implemented using any suitable software programming language, application framework, web service solution stack, virtual application containers, etc., in order to present application features and content to a client.

In some cases, the application server 260 may include application content (e.g., graphical user interface (GUI) or widget components) that interactive computing service 250 can present on client systems 210, 220 and mobile device 230, based on the user's interaction with the software application provided by the interactive computing service 250. The application content may include, for example, HTML components or code that generates HTML components that can be passed to client systems 210, 220 and mobile device 230 and rendered as a user interface. The application content may additionally include instructions executable by client systems or mobile devices to display a user interface. The application content may additionally include instructions executable by client systems 210, 220 and mobile device 230 to display a user interface using language-specific or operating systems-specific application content (e.g., instructions for generating/displaying javascript based widgets or similar components on other operating system platforms, Abstract Window Toolkit or Swing API components on the Java platform, and so on). Generally, instructions capable of rendering a widget on client systems 210, 220 and mobile device 230 may include computer executable code generated from compiling and/or interpreting C (or variants thereof), Java, PHP, Ruby, HTML, javascript, Python, AJAX, VBscript, and other programming or scripting languages used to compose and present a widget. In an example retail software application, application server 260 components may include widgets for presenting a user with a customized/specific set of categories/sub-categories, where each set includes a ranked list of items that the user has a likelihood (e.g., greater than a threshold) of selecting for purchase. Additionally, the application server 260 components may include prompts (e.g., pop-ups or other interventions) that display application content (e.g., list of items in basket or virtual shopping cart).

In some cases, the widgets on client systems 210, 220 and mobile device 230 may include a prompt (e.g., icon, text, button, etc.) that requests a user to speak (e.g., ask a query, speak a command, etc.), for example, using natural language. The client systems 210, 220 and mobile device 230 may receive the audio stream of the speech of the user, such as via a microphone coupled to or integrated with the client systems 210, 220, and mobile device 230. The client systems 210, 220, and mobile device 230 may transmit the audio stream, via the network 240, to the application server 260. In this case, the application server 260 can be configured to identify the text (e.g., words, query, etc.) of the audio stream of the voice/speech of the user (e.g., by utilizing speech recognition techniques to convert speech to text). The application server 260 can use the identified text to identify particular items in inventory and modify the user's virtual shopping cart (e.g., by adding/removing items).

The navigation component 266 is generally configured to track behavior of the user while the user is interacting with the interactive computing service 250. For example, the navigation component 266 can monitor and determine, for a given user, the number of clicks on each page, the particular categories/sub-categories visited by the user, the particular time and/or frequency in which the user visits the interactive computing service 250, amount of time spent in particular categories/sub-categories, whether the user provided feedback for a given item, the particular brands of items selected by the user, the particular geographical regions associated with the user's selections, etc. The navigation component 266 may generate a user shopping context (e.g., user shopping context 320 shown in FIG. 3) with information obtained from its monitoring and store the user shopping context in a database 254 for use by other components of the interactive computing service 250 (e.g., prediction component 264).

The prediction component 264 is generally configured to generate the taxon sets (also referred to herein as a taxonomy) to provide, e.g., via the application component 262, to the category widgets of the retail software application. As noted, each taxon set may include a ranked set of items within a particular category/sub-category that the user has a likelihood (e.g., greater than a threshold percentage) of purchasing from the retailer. As described further with reference to FIG. 3, the prediction component 264 may generate the taxon sets based on the user's shopping context provided from the navigation component 266, the store's taxonomy, etc.

Figure 3:
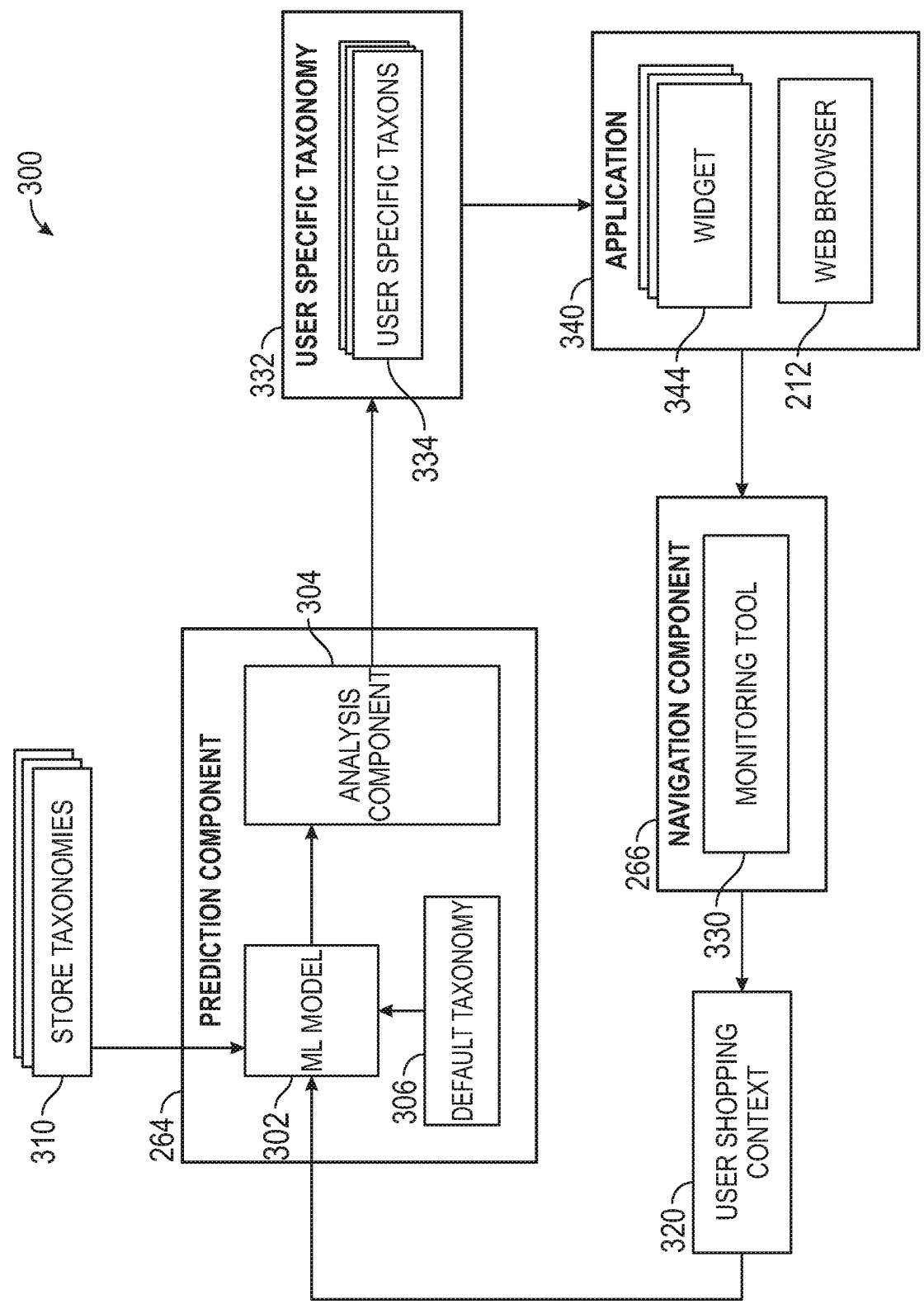
FIG. 3 illustrates components of the interactive computing service used to improve application experience of a user, according to one embodiment.

FIG. 3 further illustrates components of the interactive computing service 250 (e.g., application server 260) described relative to FIG. 2, according to one embodiment. As shown, the application 340 includes one or more category widgets 344, which interact with the web browser 212 to render application content retrieved from the interactive computing service 250. In this example, while the user is interacting with the category widgets 344, the monitoring tool 330 of the navigation component 266 monitors the user's current activity (and/or retrieves the user's previous activity) to generate the user shopping context 320. The user shopping context 320, for example, may include current and historical information regarding the time and/or manner in which categories/sub-categories of items was accessed by the user.

The prediction component 264 receives the user shopping context 320 and one or more retail store taxonomies 310. Each retail store taxonomy 310 includes the taxon sets categories/sub-categories of items for the retail store. For example, a first retail "grocery" store may include a different set of items (e.g., different brands of "chips") in a particular category (e.g., "chips") compared to a second retail "grocery" store. Thus, in this example, the retail store taxonomy 310 for the first retail "grocery" store can include different items and/or different hierarchy of items relative to the retail store taxonomy 310 for the second retail "grocery" store.

As shown, the prediction component 264 includes a machine learning (ML) model 302, default taxonomy 306, and an analysis component 304. The default taxonomy 306 includes a default (or standard) taxon sets (containing default groupings of items). The analysis component 304 evaluates the user shopping context 320, store taxonomies 310, and default taxonomy 306 with the machine learning model 302 to determine a user-specific taxonomy 332, which includes multiple user-specific taxon sets 334. In one embodiment, the user-specific taxonomy 332 is provided to the widgets 344, e.g., via the web server 252 and application component 262. In one embodiment, the prediction component 264 is configured to generate the user specific taxonomy 332 off-line. In one example, the prediction component 264 may generate (update) the user specific taxonomy 332 after the user has finished a shopping session.

Figure 4A:
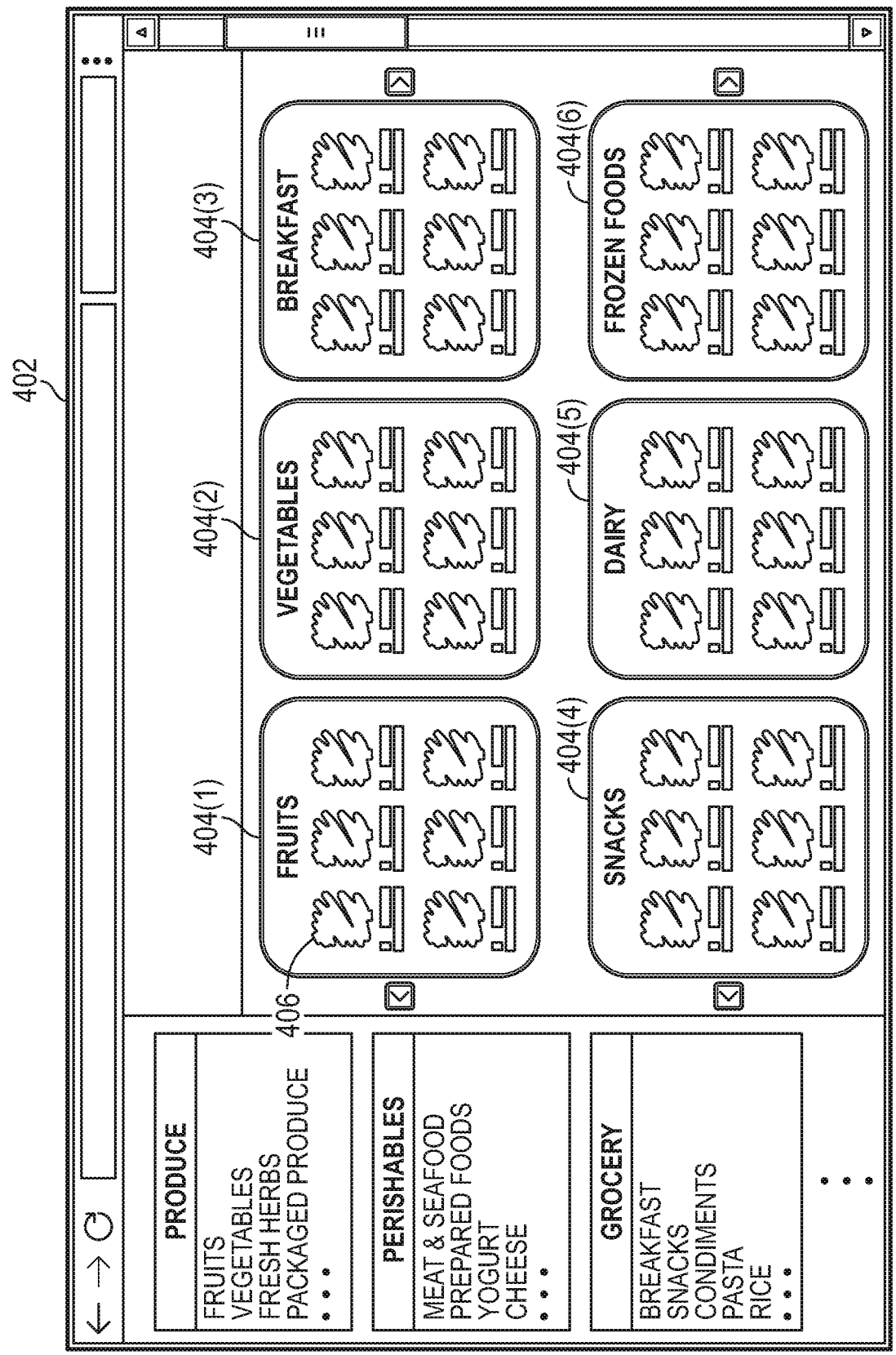
FIGS. 4A-4C illustrate an example set of pages of a retail software application provided by the interactive computing service, according to one embodiment.
Figure 4B:
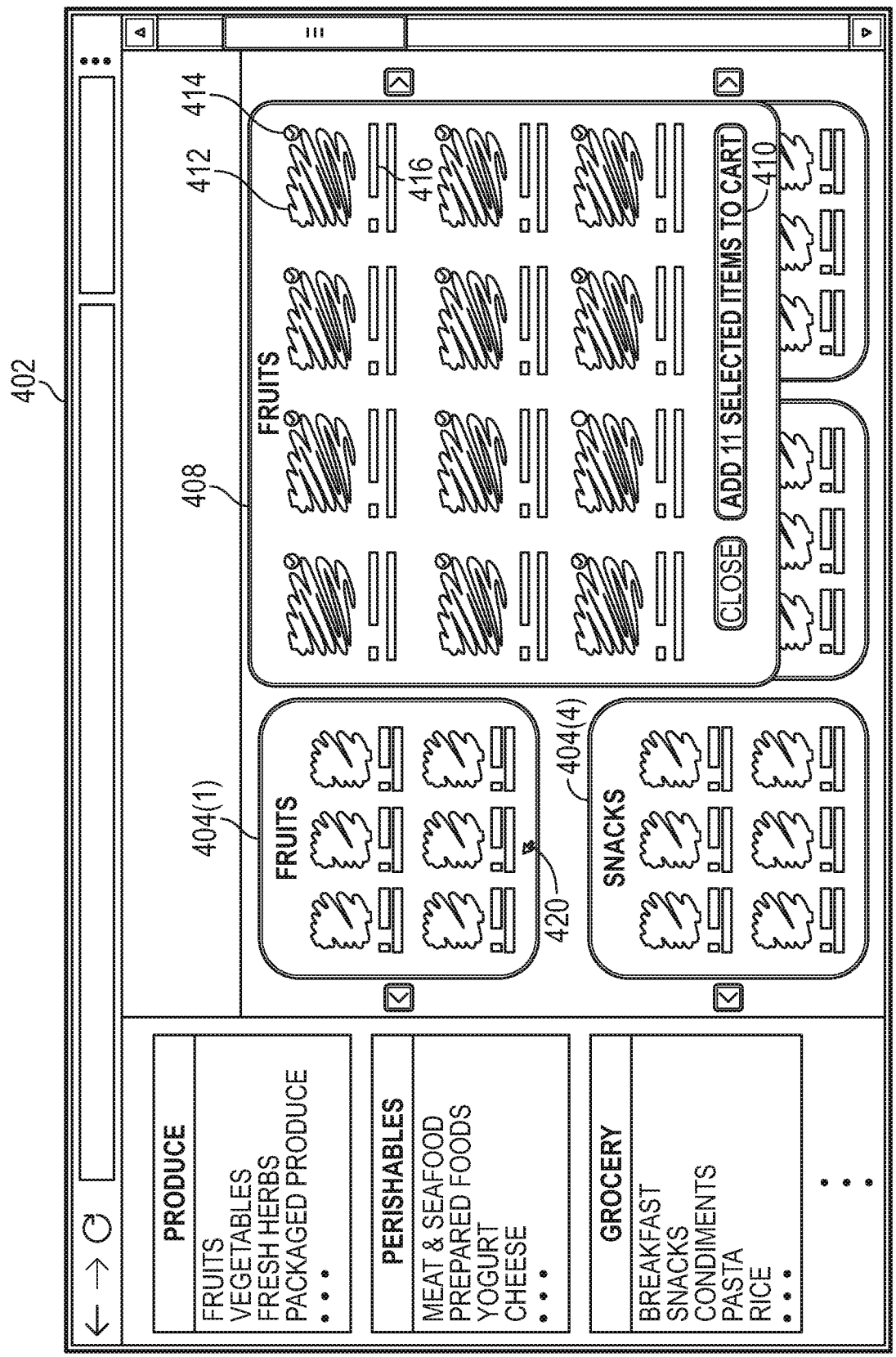
Figure 4C:
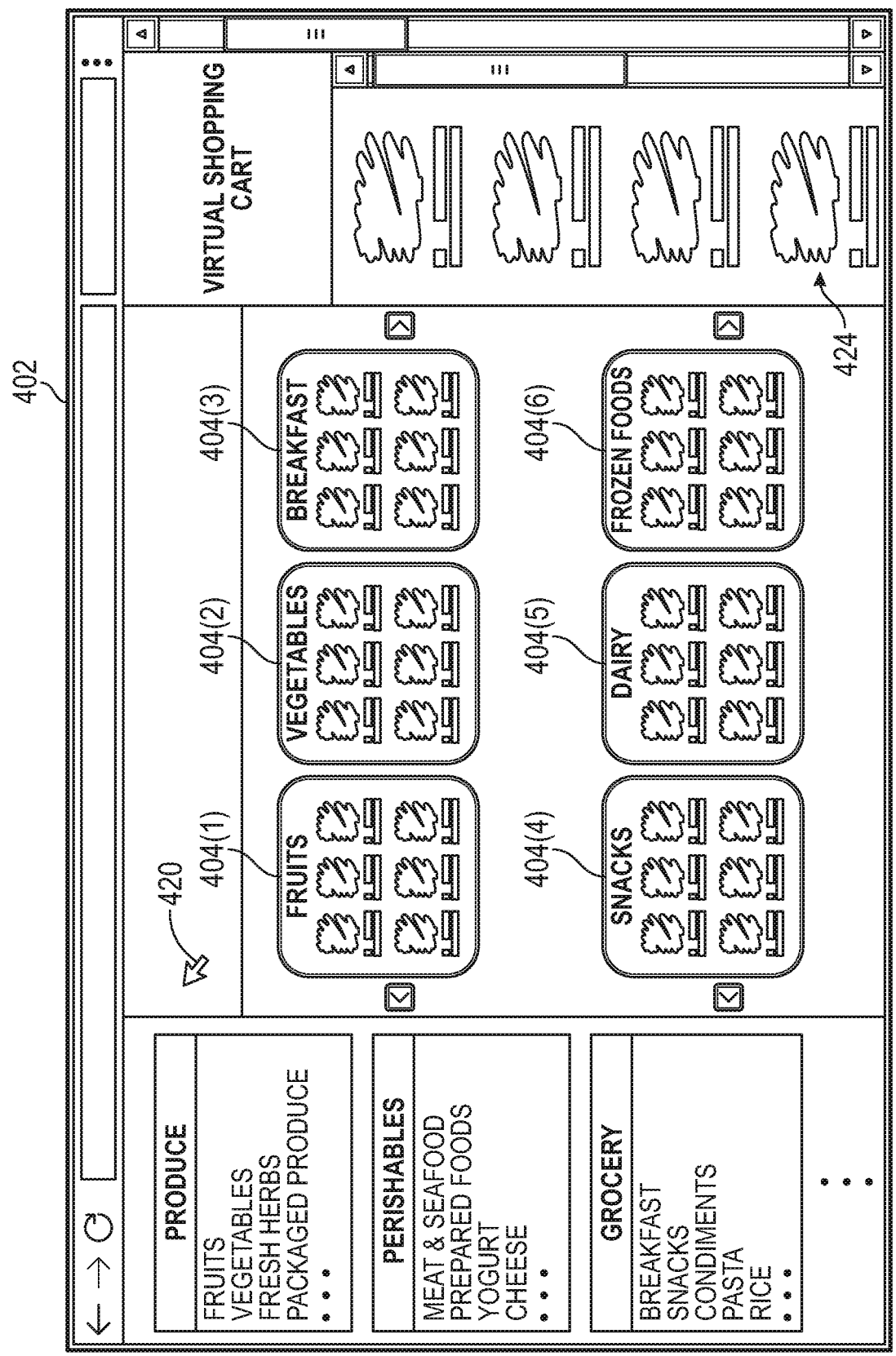

FIGS. 4A-4C illustrate example pages of a retail software application that provides one or more basket-building widgets, according to one embodiment. As shown in FIG. 4A, for an initial page 402 (e.g., storefront page), a user is provided with multiple category widgets 404(1)-(6). Each category widget 404(1)-(6) displays a list of items 406 associated with a particular taxon (e.g., category/sub-category). Here, for example, category widget 404(1) includes a list of items within "fruits," category widget 404(1) includes a list of items within "vegetables," category widget 404(3) includes a list of items within "breakfast," category widget 404(4) includes a list of items within "snacks," category widget 404(5) includes a list of items within "dairy," and category widget 404(5) includes a list of items within "frozen foods."

At a point during the user's interaction, the user may navigate (e.g., with the mouse pointer 420) within one or more elements of the category widget 404(1) as shown in FIG. 4B. In response to detecting this "mouse event" (e.g., click event, "mouseover" event, "mouseenter" event, "hover" event, etc.), a basket-building widget enlarges the contents of the category widget 404(1) in a non-modal window 408 to allow the user to interact with the items shown within the non-modal window 408. The non-modal window 408 may include (or present) a greater number of items (in the category "fruits") (e.g., twelve) than the number of items (e.g., six) shown (or presented) by the category widget 404(1). Each item within the non-modal window 408 may include an item image 412, item information 416 (e.g., item title, price, badging, etc.), and a prompt 414 (e.g., button, icon, bullet, etc.). The user can use the prompt 414 to select/deselect a given item within the non-modal window 408. In one embodiment, all of the prompts 414 for the items may be initially selected by default, and the user may de-select one or more of the items. Here, for example, the non-modal window 408 shows that one of the items has been de-selected. In another embodiment, none of the prompts 414 may be selected, and the user may select one or more of the items. The basket-building widget may detect (e.g., based on a click event) when a prompt 414 has been selected/deselected and, in response, determine a selection state (e.g., "selected" or "non-selected) of the item associated with the prompt 414. The basket-building widget may maintain the selection state of the item, e.g., by storing the selection state in a database (e.g., database 254). The non-modal window 408 further includes a prompt 410, which allows the user to bulk add the selected items to the user's basket.

At a subsequent point during the user's interaction, the user may navigate (e.g., with the mouse pointer 420) outside of the non-modal window 408, as shown in FIG. 4C. In response to detecting this "mouse event" (e.g., "mouse-leave" event), the non-modal window 408 collapses. As shown, after the items of the "fruits" category are selected, the initial page 402 provides a list of the selected items in the user's basket 424. In other embodiments, the non-modal window 408 may collapse in response to detecting at least one of a click event outside of the non-modal 408 (e.g., the user may have clicked another category widget 404 on page 402, the user may have clicked another element (or panel) on page 402, etc.), an escape sequence (e.g., "ESC" key via an I/O device, such as a keyboard), a click event on a prompt (e.g., "close" prompt) within the non-modal window 408 that allows the user to dismiss the non-modal window 408, etc.

Figure 5A:
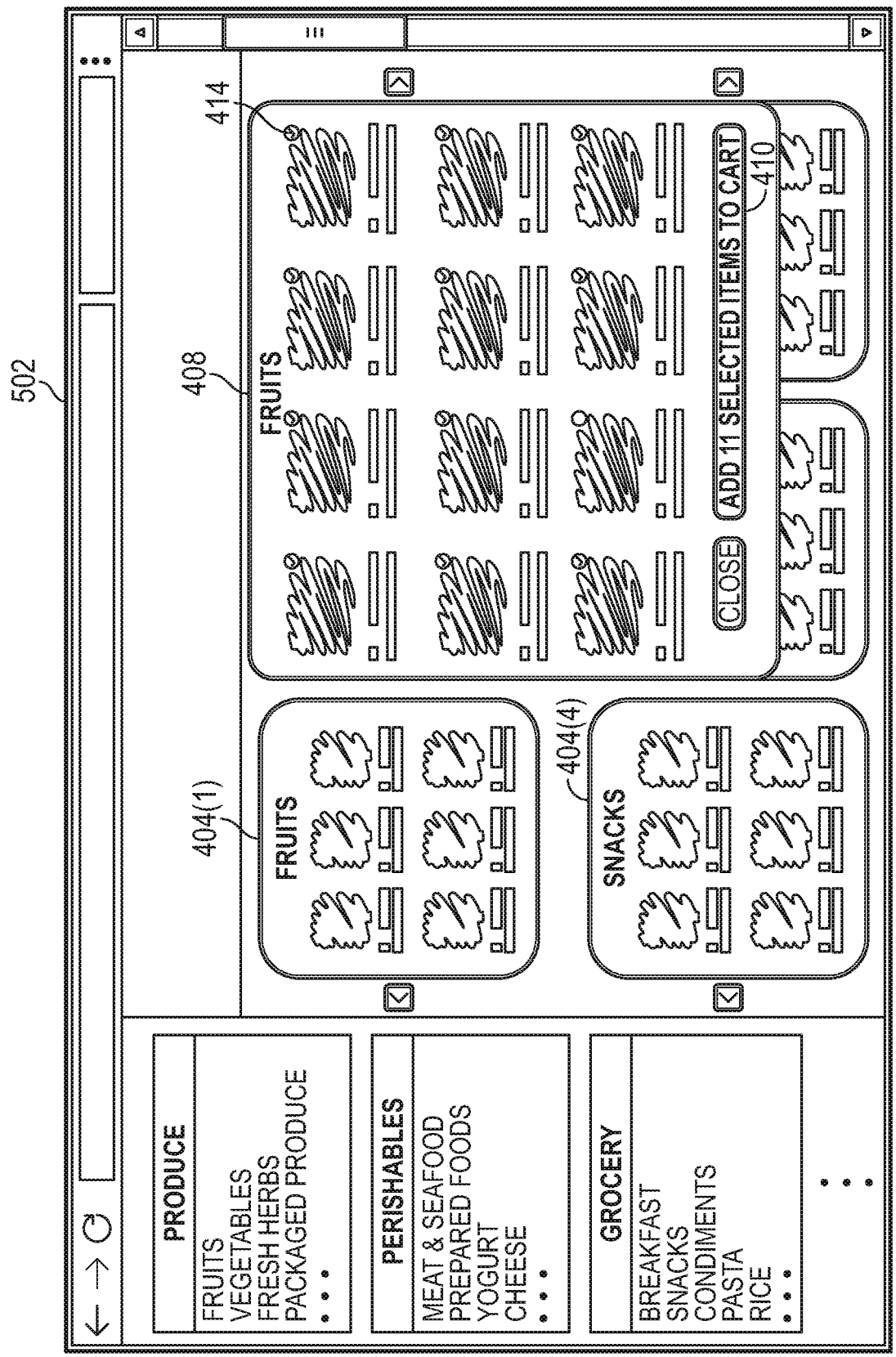
FIG. 5A-5C illustrate another example set of pages of a retail application provided by the interactive computing service, according to one embodiment.
Figure 5B:
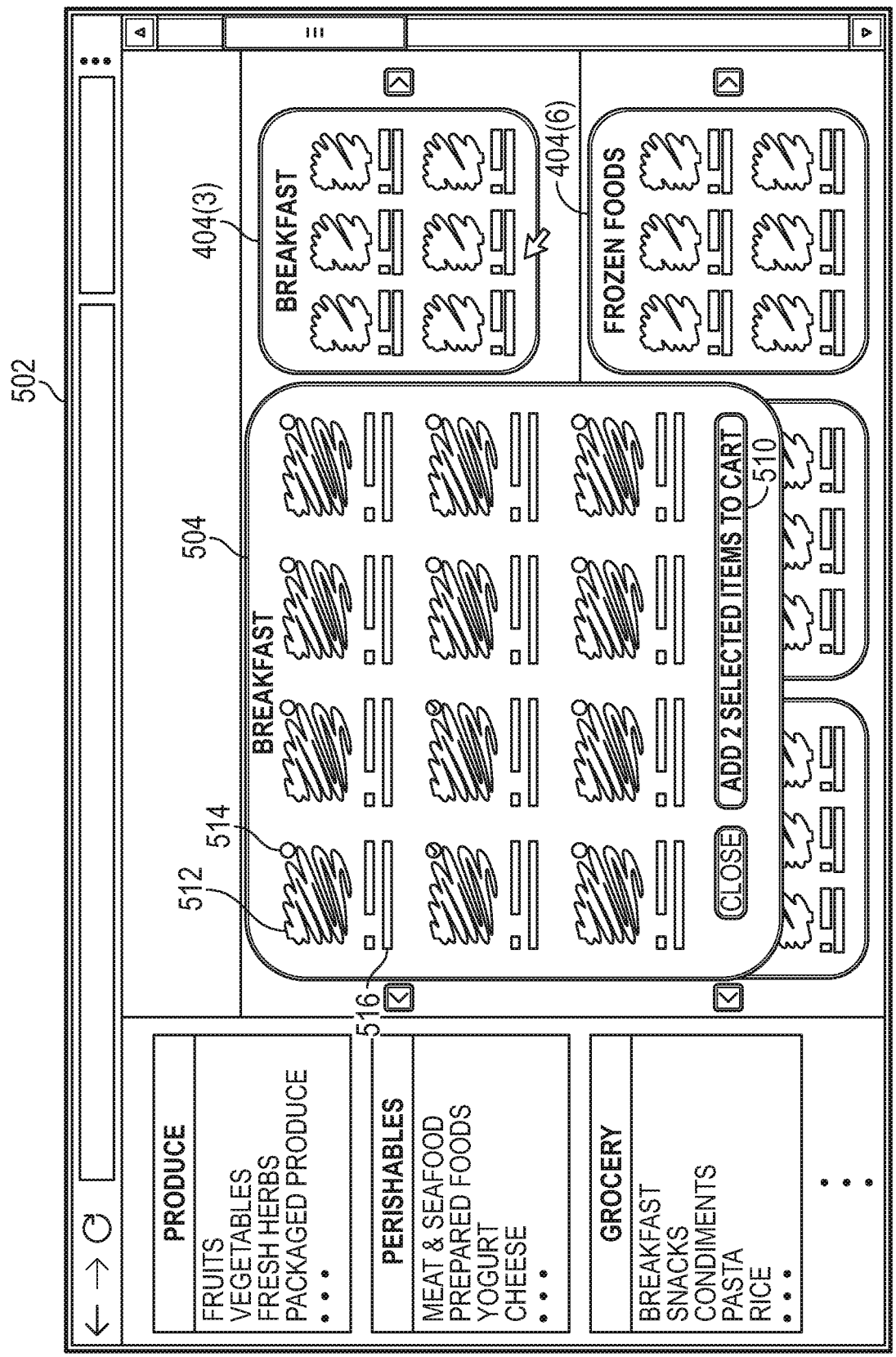
Figure 5C:
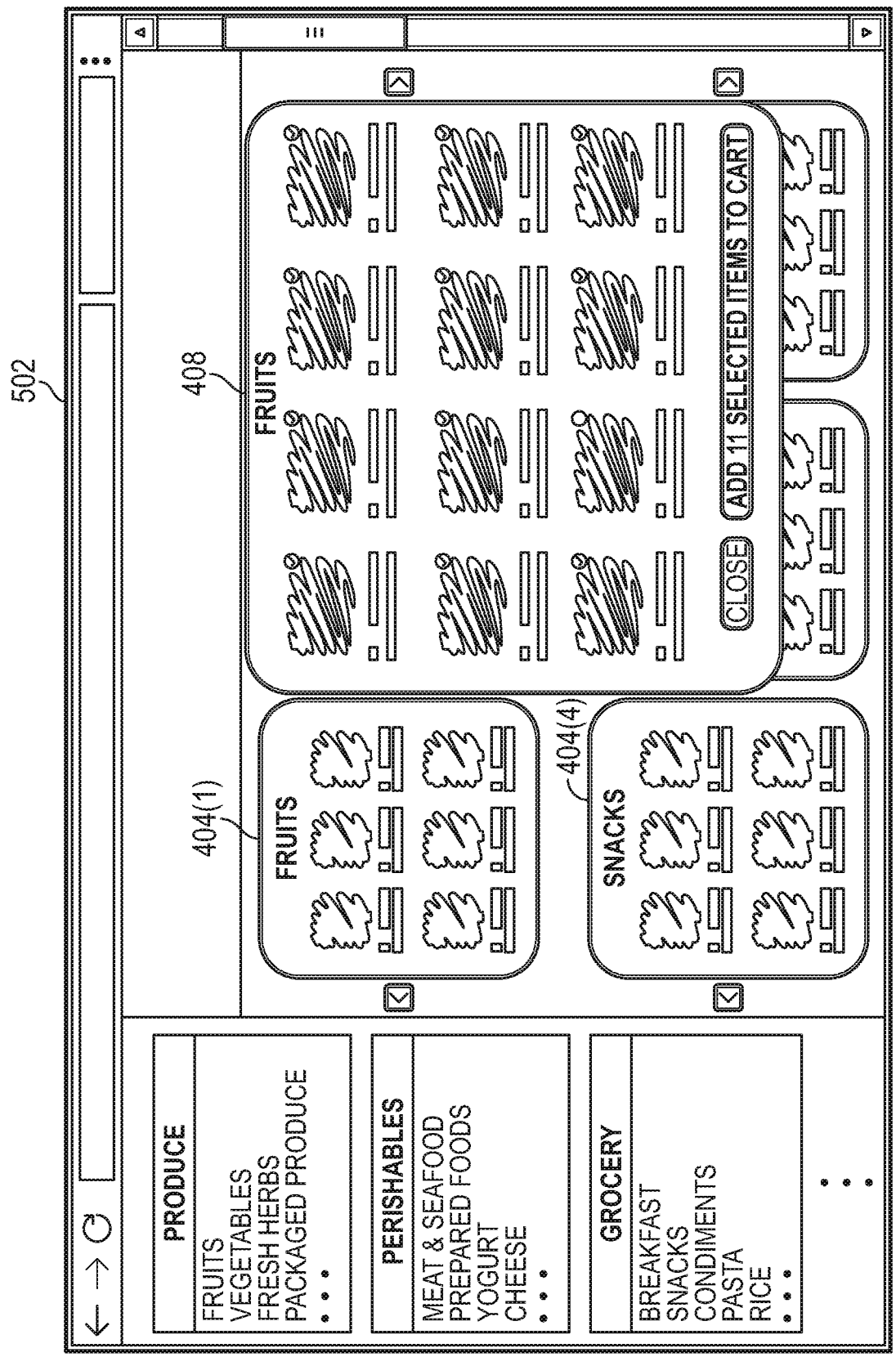

FIGS. 5A-5C illustrate example pages of a retail software application that provides one or more basket-building widgets, according to one embodiment. As shown in FIG. 5A, for an initial page 502 (e.g., storefront page), a user is provided with multiple category widgets 404(1)-(6). Upon detecting a "mouse event" within the category widget 404(1), a basket-building widget enlarges the contents of the category widget 404(1) in a non-modal window 408 to allow the user to interact with the items shown within the non-modal window 408. Similar to FIG. 4B, here, in FIG. 5A, the user uses one of the prompts 414 within the non-modal window 408 to de-select one the pre-selected items. However, compared to FIG. 5A, the user refrains from selecting prompt 410 to add the eleven selected items within the non-modal window 408 to the user's basket.

Rather, at a subsequent point during the user's interaction, the user navigates outside of the non-modal window 408 and into the category widget 404(3), as shown in FIG. 5B. As shown, the basket-building widget collapses the non-modal window 408 (e.g., in response to the mouse pointer navigating outside of the non-modal window 408) and enlarges the contents of the category widget 404(3) in a non-modal window 504 (e.g., to allow the user to interact with the items show within the non-modal window 504). Similar to non-modal window 408, the non-modal window 504 includes, for each item, an item image 512, item information 516, and a prompt 514 (e.g., for selecting/de-selecting the item).

Here, in this particular embodiment, the user uses the prompts 514 to de-select all but two of the items within the non-modal window 504, but the user refrains from selecting prompt 510 to add the two selected items within the non-modal window 504 to the user's basket.

At a further subsequent point during the user's interaction, the user navigates outside of the non-modal window 504 and back into the category widget 404(1), as shown in FIG. 5C. In response, the basket-building widget collapses the non-modal window 504 (e.g., in response to the mouse pointer navigating outside of the non-modal window 504) and enlarges the contents of the category widget 404(1). As shown, although the basket-building widget previously collapsed the non-modal window 408 (e.g., in response to the user navigating outside of the non-modal window 408), the basket-building widget maintains (or persists) the selection "state" of the items within the non-modal window 408 (e.g., whether the items have been selected/de-selected). In one embodiment, the basket-building widget can maintain the selection state information within a non-modal window by making (or sending) AJAX calls to the interactive computing service 250, which persists the selection state information within each category widget for a customer in a data store (e.g., database 254). For example, whenever a "mouse event" for a category widget is detected, the basket-building widget can retrieve the latest state for each item (e.g., using an AJAX call) in order to render the correct state for each item.

Figure 6A:
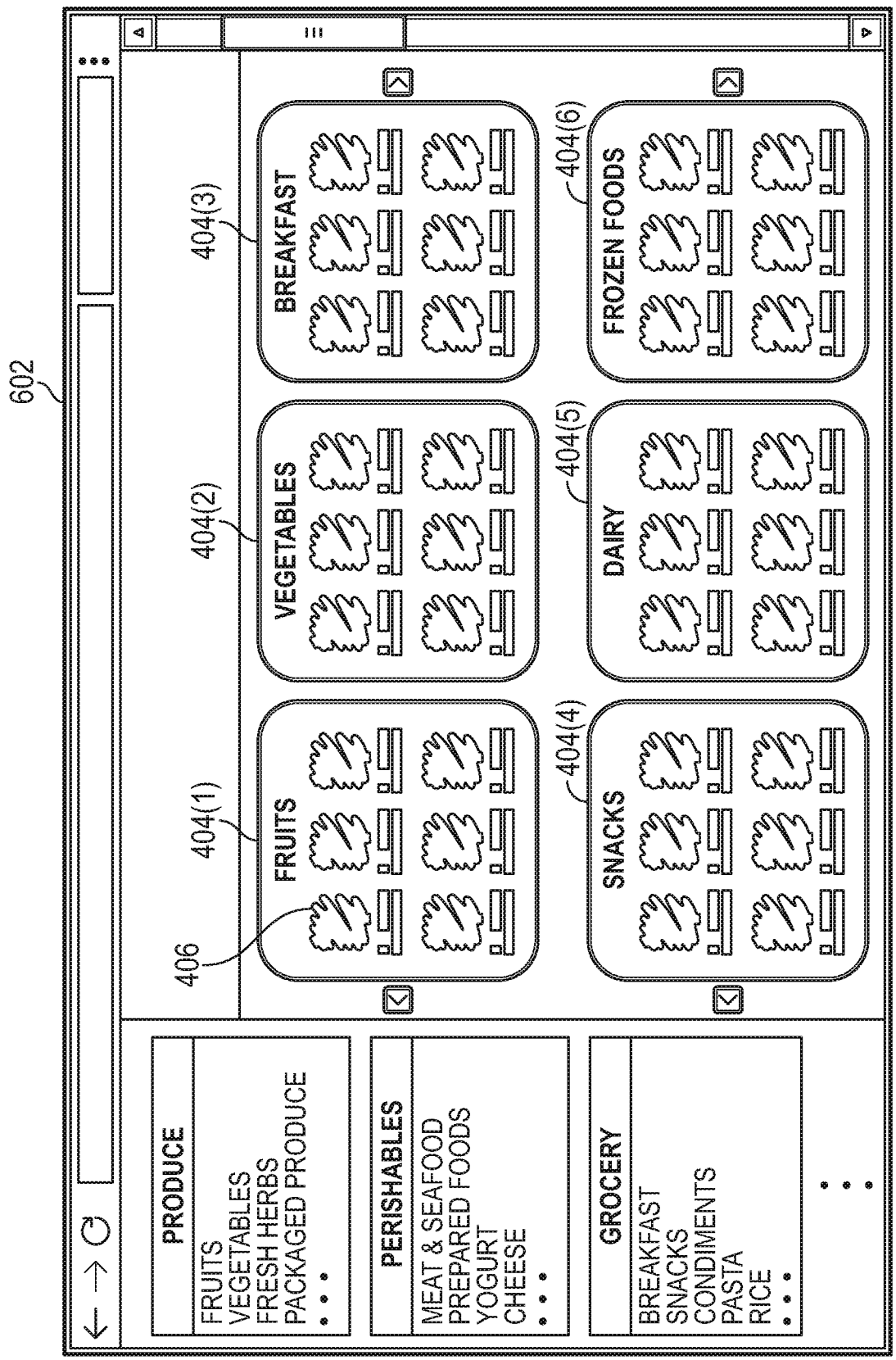
FIGS. 6A-6B illustrate yet another example of pages of a retail application provided by the interactive computing service, according to one embodiment.
Figure 6B:
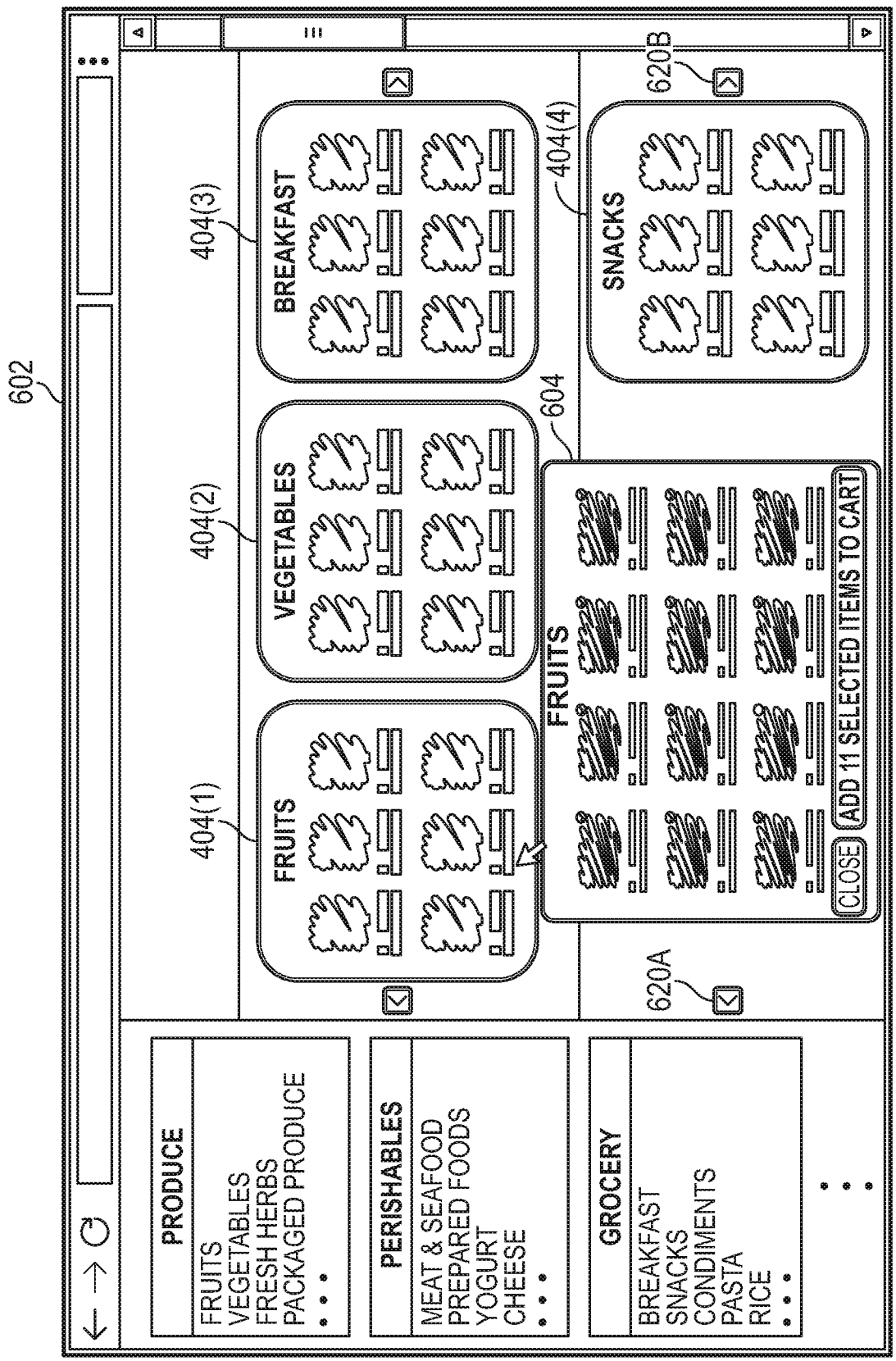

FIGS. 6A-6B illustrate example pages of a retail software application that provides one or more basket-building widgets, according to one embodiment. Here, similar to FIG. 4A, the initial page 602 (e.g., storefront page) provides multiple category widgets 404(1)-(6), each displaying a list of items 406 associated with a particular taxon. At a later point in the user's interaction, in response to detecting the mouse pointer 420 within the category widget 404(1), the basket-building widget shows an expanded view of the contents of the category widget 404(1) in a non-modal window 604. However, compared to the non-modal windows 408 and 504, here the non-modal window 604 does not overlap any of the category widgets 404. Instead, the basket-building widget shifts one or more of the category widgets 404 (e.g., category widgets 404(4)-(6)) in a direction (e.g., to the right direction when facing the page 602) in order to display the non-modal window 604, such that it does overlap any category widget 404. In one embodiment, the basket-building widget can shift the category widgets using one or more javascript functions, such as moveTo( ), moveBy( ), resizeBy( ), resizeTo( ), etc. In this embodiment, the user is able to access the shifted category widgets via scrolling elements 620A and 620B.

Figure 7:
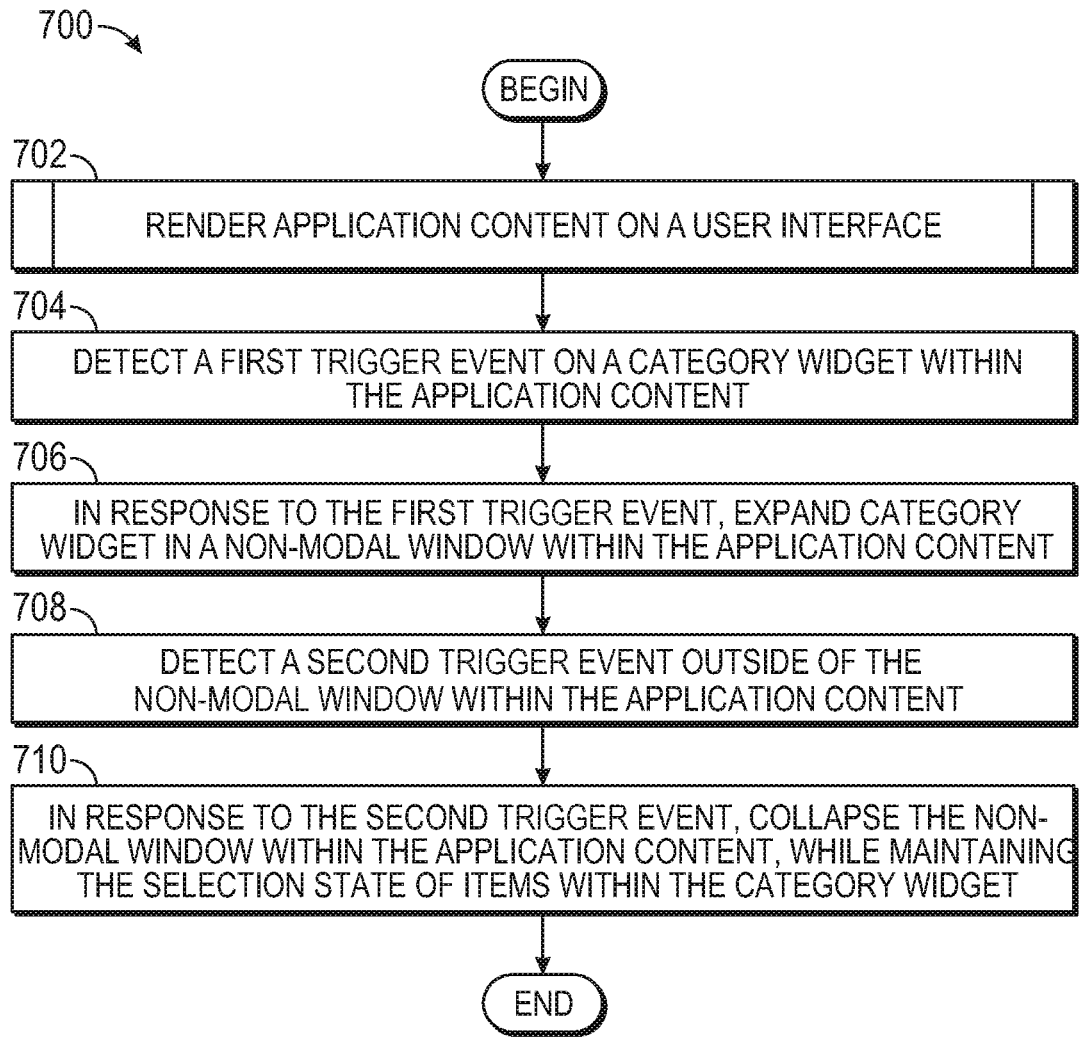
FIG. 7 is a flowchart illustrating a method for providing basket-building widget(s) within application content on a user interface, according to one embodiment.

FIG. 7 is a flowchart illustrating a method 700 for providing basket-building widget(s) within application content on a user interface, according to one embodiment. The method 700 may be performed by an application (e.g., a retail application provided by one or more components of the interactive computing service 250).

The method 700 begins at block 702, where the application renders application content on a user interface. At block 704, the application detects a first trigger event (e.g., mouse event) on a category (sub-category) widget (e.g., category widget 404(1)) within the application content (e.g., page 402). In one embodiment, the first trigger event may include at least one of a click event, mouseover event, a mouseenter event, and a hover event. At block 706, the application expands the category widget in a non-modal window (e.g., non-modal window 408) within the application content, in response to detecting the first trigger event. In one embodiment, the application can use javascript commands, jquery commands, etc. to generate the non-modal window.

At block 708, the application detects a second trigger event outside of the non-modal window within the application content. The second trigger event can include at least one of a click event, mouseleave event, a hover event, etc. With reference to FIG. 4C, for example, the application may detect that the mouse pointer has moved outside of the non-modal window, detect a user click outside of the non-modal window (and the category widget 404(1)), etc. At block 710, the application collapses the non-modal window within the application content, while maintaining the selection state of items within the category widget.

Figure 8:
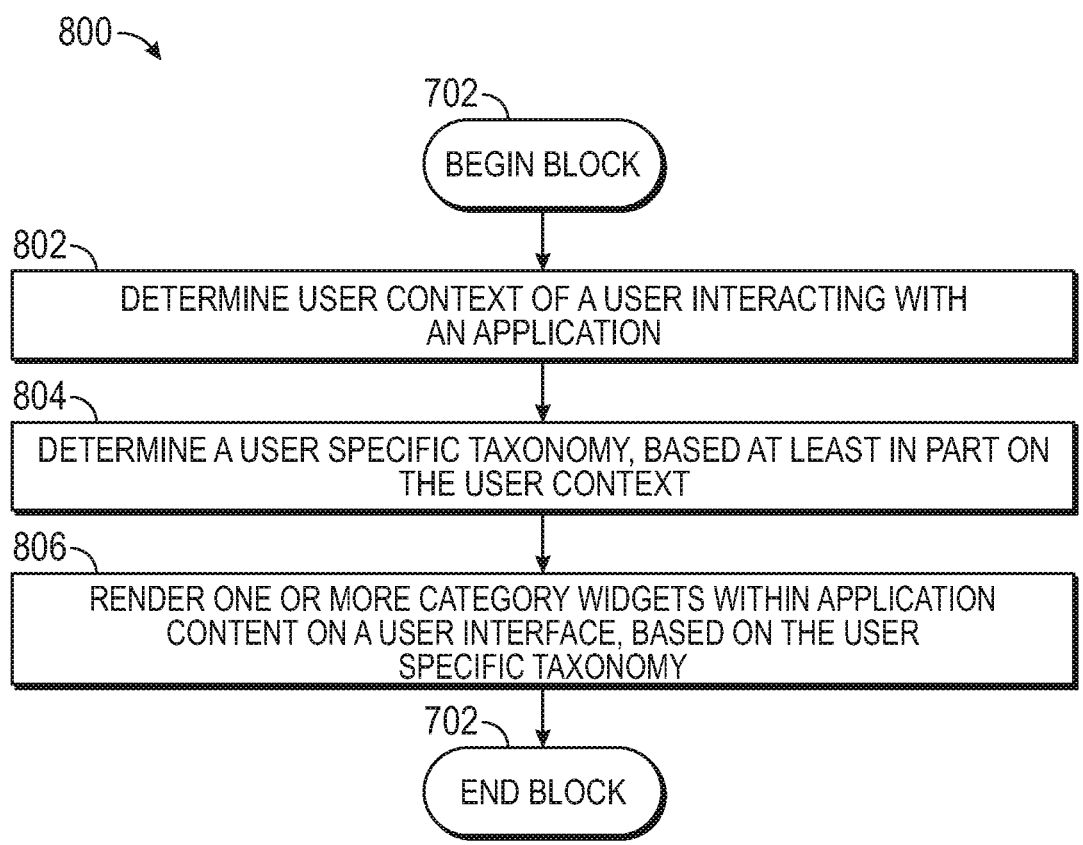
FIG. 8 is a flowchart illustrating a method for rendering user-specific application content within the basket-building widget(s), according to one embodiment.

FIG. 8 is a flowchart illustrating a method 800 for rendering user-specific application content within the basket-building widget(s), according to one embodiment. The method 800 may be performed by an application (e.g., a retail application provided by one or more components of the interactive computing service 250). In one embodiment, the method 800 may be performed as part of block 702 of method 700 illustrated in FIG. 7.

The method 800 begins at block 802, where the application determines a user context (e.g., user shopping context 320) of a user interacting with an application. For example, the user context may include information such as the categories/sub-categories of items visited by the user, the amount of time spent in particular categories/sub-categories, previous history of items selected by the user, location of retail stores in proximity to the user, etc. At block 804, the application determines a user-specific taxonomy, based at least in part on the user context. As noted, the user-specific taxonomy may include a set of taxons, each taxon having a set of ranked items that the user has a likelihood (e.g., greater than a threshold percentage) of purchasing.

At block 806, the application renders one or more category (sub-category) widgets within application content (e.g., page 402) on a user interface, based on the user-specific taxonomy. In one embodiment, the application may provide, using one or more javascript tools, each category widget with a different one of the taxons in the user-specific taxonomy. Each category widget may display (or present) the ranked set of items (particular to the user) within the category widget. Additionally, the basket-building widget can display an expanded view of the ranked set of items (particular to the user), e.g., in response to detecting a mouse event in one of the category widgets.

Figure 9:
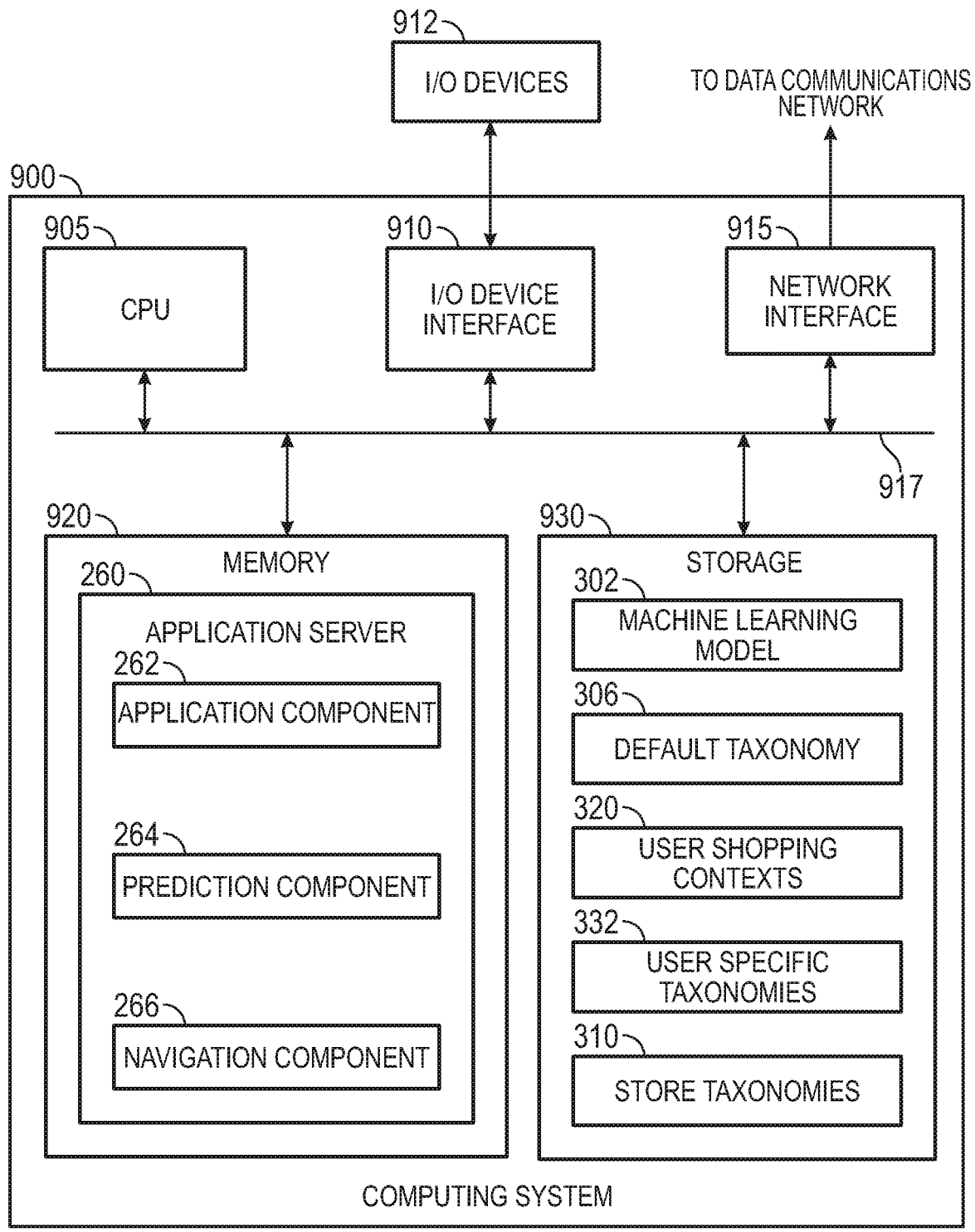
FIG. 9 illustrates an example computing system used to provide basket-building widget(s) within application content on a user interface, according to one embodiment.

FIG. 9 illustrates a computing system 900 configured to provide basket-building widget(s) within application content on a user interface, according to one embodiment.

As shown, the computing system 900 includes, without limitation, a central processing unit (CPU) 905, a network interface 915, a memory 920, and storage 960, each connected to a bus 917. The computing system 900 may also include an I/O device interface 910 connecting I/O devices 912 (e.g., keyboard, mouse, and display devices) to the computing system 900. Further, in context of this disclosure, the computing elements shown in the computing system 900 may correspond to a physical computing system (e.g., a system in a data center) or may be a virtual computing instance executing within a computing cloud. In one embodiment, the computing system 900 can be an example of the computing system illustrated in FIG. 2 (e.g., interactive computing service 250).

The CPU 905 retrieves and executes programming instructions stored in the memory 920 as well as stores and retrieves application data residing in the memory 920. The interconnect 917 is used to transmit programming instructions and application data between CPU 905, I/O devices interface 910, storage 960, network interface 915, and memory 920. Note CPU 905 is included to be representative of a single CPU, multiple CPUs, a single CPU having multiple processing cores, and the like. Memory 920 is generally included to be representative of a random access memory. The storage 960 may be a disk drive storage device. Although shown as a single unit, storage 960 may be a combination of fixed and/or removable storage devices, such as fixed disc drives, removable memory cards, or optical storage, network attached storage (NAS), or a storage area-network (SAN). The storage 960 includes machine learning model 302, default taxonomy 306, user shopping contexts 320 (e.g., for different users), user specific taxonomies 332 (e.g., for different users), and store taxonomies 310, each of which is described in more detail above. Illustratively, the memory 920 includes the application server 260, which includes the application component 262, the prediction component 264, and the navigation component 266, each of which is described in more detail above. Although not shown, the memory 920 can include the web server 252, which is described in more detail above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., retail application provided by the interactive computing service 250) or related data (e.g., database 254) available in the cloud. For example, one or more components of the interactive computing service 250 (e.g., the web server 252, application server 260, etc.) could execute on a computing system in the cloud and provide application components (e.g., category widget(s), basket-building widget(s)) for rendering on an interface of the client systems 210, 22, and mobile device 230. In such a case, the one or more components of the interactive computing service 250 could generate data (e.g., taxons) for the application components and store the data at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a memory storing one or more applications, which, when executed on the processor perform an operation comprising:
      determining a shopping context of a user interacting with an application, wherein the shopping context comprises information associated with a history of previous interactions of the user with the application;
      determining, based on evaluating the shopping context with a machine learning model, one or more retail item categories for the user interacting with the application;
      providing at least a first widget to present a first set of retail items from a first retail item category of the one or more retail item categories on an initial page of the application;
      detecting, on the initial page of the application, a first trigger event within the first widget;
      presenting, in response to detecting the first trigger event within the first widget, a non-modal window on the initial page of the application, wherein the non-modal window provides an expanded view of the first retail item category associated with the first widget, wherein the expanded view of the first retail item category presents a second set of retail items, including the first set of retail items, from the first retail item category, and wherein a number of retail items in the second set of retail items is greater than a number of retail items in the first set of retail items;
      detecting a second trigger event associated with a first retail item of the second set of retail items within the non-modal window; and
      in response to detecting the second trigger event, determining a selection state of the first retail item and storing the selection state of the first retail item.

2. The system of claim 1, wherein the non-modal window further provides, for each retail item within the non-modal window, a prompt to allow the user to select or de-select the retail item within the non-modal window.

3. The system of claim 2, wherein detecting the second trigger event comprises determining that the prompt for the first retail item has been selected or de-selected.

4. The system of claim 1, wherein:
the first set of retail items from the first retail item category associated with the first widget comprises a ranked set of retail items; and
each retail item in the ranked set has a likelihood above a threshold of being purchased by the user while the user is interacting with the application.

5. A system, comprising:
a processor; and
a memory storing one or more applications, which, when executed on the processor perform an operation comprising:
detecting, on a first page of an application, a first trigger event within a first widget on the first page, wherein the first widget indicates a first set of retail items from a first retail item category of a plurality of retail item categories associated with a user interacting with the application, wherein the plurality of retail item categories are determined based on evaluating, with a machine learning model, information associated with a history of previous interactions of the user with the application;
presenting, in response to detecting the first trigger event within the first widget, a first non-modal window on the first page of the application, wherein the first non-modal window (i) indicates a second set of retail items, including the first set of retail items, from the first retail item category, the second set of retail items having a greater number of retail items than the first set of retail items and (ii) comprises information associated with each retail item of the second set of retail items from the first retail item category;
after presenting the first non-modal window, detecting a second trigger event associated with a first retail item of the second set of retail items within the first non-modal window, wherein the second trigger event indicates whether the first retail item has been selected by the user;
in response to detecting the second trigger event, determining a selection state of the first retail item and storing the selection state of the first retail item;
after presenting the first non-modal window, detecting a third trigger event outside of the first non-modal window on the first page of the application; and
removing, in response to detecting the third trigger event, the first non-modal window from the first page of the application.

6. The system of claim 5, wherein the first non-modal window comprises, for each retail item of the first second set of retail items, a first prompt that allows the user to select or de-select the retail item.

7. The system of claim 6, wherein detecting the second trigger event comprises determining that the first prompt for the first retail item has been selected or de-selected by the user.

8. The system of claim 6, wherein the first non-modal window further comprises a second prompt that allows the user to add a selected one or more retail items of the second set of retail items to a virtual shopping cart provided on the first page of the application.

9. The system of claim 6, the operation further comprising:
after removing the first non-modal window from the first page of the application, detecting a fourth trigger event within the first widget; and
in response to detecting the fourth trigger event:
retrieving the stored selection state of the first retail item; and
presenting the first non-modal window on the first page of the application, wherein the first non-modal window indicates the stored selection state of the first retail item.

10. The system of claim 5, wherein:
detecting the third trigger event outside of the first non-modal window comprises detecting the third trigger event within a second widget on the first page of the application; and
the second widget indicates a third set of retail items from a second retail item category of the plurality of retail item categories associated with the user interacting with the application.

11. The system of claim 10, the operation further comprising, in response to detecting the third trigger event, presenting a second non-modal window on the first page of the application, wherein the second non-modal window comprises information associated with each retail item of the third set of retail items.

12. The system of claim 5, wherein:
the first trigger event comprises at least of a click event, a mouseover event, a mouseenter event, or a hoverevent; and
the third trigger event comprises at least one of a click event, a mouseout event, or a mouseleave event.

13. The system of claim 5, wherein the second trigger event comprises a click event.

14. A computer-implemented method, comprising:
detecting, on a first page of an application, a first trigger event within a first widget on the first page, wherein the first widget indicates a first set of retail items from a first retail item category of a plurality of retail item categories associated with a user interacting with the application, wherein the plurality of retail item categories are determined based on evaluating, with a machine learning model, information associated with a history of previous interactions of the user with the application;
presenting, in response to detecting the first trigger event within the first widget, a first non-modal window on the first page of the application, wherein the first non-modal window (i) indicates a second set of retail items, including the first set of retail items, from the first retail item category, the second set of retail items having a greater number of retail items than the first set of retail items and (ii) comprises information associated with each retail item of the second set of retail items from the first retail item category;
after presenting the first non-modal window, detecting a second trigger event associated with a first retail item of the second set of retail items within the first non-modal window, wherein the second trigger event indicates whether the first retail item has been selected by the user;

in response to detecting the second trigger event, determining a selection state of the first retail item and storing the selection state of the first retail item;

after presenting the first non-modal window, detecting a third trigger event outside of the first non-modal window on the first page of the application; and removing, in response to detecting the third trigger event, the first non-modal window from the first page of the application.

15. The computer-implemented method of claim 14, wherein the first non-modal window comprises, for each retail item of the second set of retail items, a first prompt that allows the user to select or de-select the retail item.

16. The computer-implemented method of claim 15, wherein detecting the second trigger event comprises determining that the first prompt for the first retail item has been selected or de-selected by the user.

17. The computer-implemented method of claim 15, wherein the first non-modal window further comprises a second prompt that allows the user to add a selected one or more retail items of the second set of retail items to a virtual shopping cart provided on the first page of the application.

18. The computer-implemented method of claim 15, further comprising:

after removing the first non-modal window from the first page of the application, detecting a fourth trigger event within the first widget; and in response to detecting the fourth trigger event:

retrieving the stored selection state of the first retail item; and presenting the first non-modal window on the first page of the application, wherein the first non-modal window indicates the stored selection state of the first retail item.

19. The computer-implemented method of claim 14, wherein:

detecting the third trigger event outside of the first non-modal window comprises detecting the third trigger event within a second widget on the first page of the application; and the second widget indicates a third set of retail items from a second retail item category of the plurality of retail item categories associated with the user interacting with the application.

20. The computer-implemented method of claim 19, further comprising, in response to detecting the third trigger event, presenting a second non-modal window on the first page of the application, wherein the second non-modal window comprises information associated with each retail item of the third set of retail items.

* * * * *

UNITED STATES PATENT AND TRADEMARK OFFICE
CERTIFICATE OF CORRECTION

| | | |
|---|---|---|
| PATENT NO. | : 11,436,665 B1 | Page 1 of 1 |
| APPLICATION NO. | : 16/364723 | |
| DATED | : September 6, 2022 | |
| INVENTOR(S) | : Feroz Abdul Kadar | |

It is certified that error appears in the above-identified patent and that said Letters Patent is hereby corrected as shown below:

In the Claims

In Column 15, Line 59, in Claim 6, before "second" delete "first".

Signed and Sealed this
Twenty-eighth Day of February, 2023

Katherine Kelly Vidal
*Director of the United States Patent and Trademark Office*